United States Patent
Trichy et al.

(10) Patent No.: US 9,577,527 B2
(45) Date of Patent: Feb. 21, 2017

(54) CURRENT METERING FOR TRANSITIONING BETWEEN OPERATING MODES IN SWITCHING REGULATORS

(71) Applicant: Active-Semi, Inc., Tortola (VG)

(72) Inventors: Narasimhan Trichy, Plano, TX (US); James Allen Kohout, Dallas, TX (US)

(73) Assignee: Active-Semi, Inc. (VG)

( * ) Notice: Subject to any disclaimer, the term of this patent is extended or adjusted under 35 U.S.C. 154(b) by 169 days.

(21) Appl. No.: 14/704,864

(22) Filed: May 5, 2015

(65) Prior Publication Data
US 2016/0276931 A1    Sep. 22, 2016

Related U.S. Application Data

(60) Provisional application No. 62/135,799, filed on Mar. 20, 2015.

(51) Int. Cl.
*H02M 3/158* (2006.01)
*H02M 1/00* (2006.01)

(52) U.S. Cl.
CPC .... *H02M 3/158* (2013.01); *H02M 2001/0035* (2013.01); *Y02B 70/16* (2013.01)

(58) Field of Classification Search
CPC ....... H02M 3/1588; H02M 2001/0032; H02M 2001/0035
See application file for complete search history.

(56) References Cited

U.S. PATENT DOCUMENTS

| | | | |
|---|---|---|---|
| 2008/0018314 A1* | 1/2008 | Sheng | H02M 3/157 323/285 |
| 2008/0030183 A1* | 2/2008 | Valentino | H02M 3/157 323/285 |
| 2008/0042709 A1* | 2/2008 | Chen | H02M 3/156 327/175 |
| 2008/0174286 A1* | 7/2008 | Chu | H02M 3/1588 323/271 |
| 2009/0174379 A1* | 7/2009 | Lima | H02M 3/1588 323/282 |
| 2010/0148737 A1* | 6/2010 | Li | H02M 3/1588 323/282 |
| 2010/0148741 A1* | 6/2010 | Chen | H02M 3/158 323/285 |

(Continued)

*Primary Examiner* — Timothy J Dole
*Assistant Examiner* — Yusef Ahmed
(74) *Attorney, Agent, or Firm* — Imperium Patent Works; Daniel D. Tagliaferri; Amir V. Adibi

(57) ABSTRACT

Current metering for transitioning to low power operation in switching regulators is disclosed. In an exemplary embodiment, a method is provided that includes generating pulse width modulated charging cycles that enable current to flow to an inductor to adjust an output voltage, and detecting a skipped charging cycle. The method also includes determining whether a number of charging cycles are skipped over a time interval that begins when the skipped charging cycle is detected. The method also includes transitioning to a low power operating mode if it determined that the number of charging cycles have been skipped over the selected time interval. During the low power operating mode pulse frequency modulated charging cycles are generated that enable the current to flow to the inductor to generate the output voltage.

16 Claims, 9 Drawing Sheets

(56) References Cited

U.S. PATENT DOCUMENTS

| | | | | |
|---|---|---|---|---|
| 2010/0201336 A1* | 8/2010 | Chen | H02M 3/1588 | 323/285 |
| 2010/0283442 A1* | 11/2010 | Nakashima | H02M 3/1588 | 323/283 |
| 2010/0301822 A1* | 12/2010 | Chen | H02M 3/156 | 323/283 |
| 2011/0057637 A1* | 3/2011 | Liu | H02M 3/156 | 323/287 |
| 2011/0101946 A1* | 5/2011 | Nguyen | H02M 3/158 | 323/282 |
| 2012/0038335 A1* | 2/2012 | Hung | H02M 3/1588 | 323/282 |
| 2012/0091981 A1* | 4/2012 | Komiya | H02M 3/156 | 323/282 |
| 2012/0217946 A1* | 8/2012 | Ju | H02M 3/156 | 323/285 |
| 2013/0077350 A1* | 3/2013 | Mao | H02M 3/33523 | 363/16 |
| 2014/0097814 A1* | 4/2014 | Brewster | H02M 3/156 | 323/282 |
| 2014/0112035 A1* | 4/2014 | Shu | H02M 1/36 | 363/50 |
| 2014/0217999 A1* | 8/2014 | Wibben | H02M 1/36 | 323/282 |
| 2014/0253080 A1* | 9/2014 | Jiang | G05F 1/62 | 323/284 |
| 2014/0266090 A1* | 9/2014 | Wei | H02M 3/156 | 323/271 |
| 2015/0145439 A1* | 5/2015 | Szolusha | H05B 33/0851 | 315/307 |
| 2015/0229212 A1* | 8/2015 | Shiwaya | H02M 3/158 | 323/282 |
| 2016/0049859 A1* | 2/2016 | de Cremoux | H02M 1/08 | 323/282 |
| 2016/0226375 A1* | 8/2016 | Phadke | H02M 3/04 | |
| 2016/0336857 A1* | 11/2016 | Liu | H02M 3/1588 | |

* cited by examiner

CURRENT METERING FOR TRANSITIONING BETWEEN OPERATING MODES IN SWITCHING REGULATORS

CLAIM OF PRIORITY UNDER 35 U.S.C. §119

This application claims the benefit under 35 U.S.C. §119 of U.S. Provisional Application Ser. No. 62/135,799, entitled "Current Metering For Transitioning Between Operating Modes In Switching Regulators," filed Mar. 20, 2015, the subject matter of which is incorporated herein by reference.

TECHNICAL FIELD

The present disclosure relates generally to power conversion, and more specifically, to the design and operation of switching regulators for use in power conversion.

BACKGROUND

Electronic switch-mode DC to DC regulators convert one DC voltage level to another by storing the input energy temporarily and then releasing that energy to an output at a different voltage. The storage may be in either magnetic field storage components (inductors, transformers) or electric field storage components (capacitors). This conversion method is more power efficient (often 75% to 98%) than linear voltage regulation (which dissipates unwanted power as heat). The efficiency of switching regulators is beneficial to increasing the running time of battery operated devices and has increased due to the use of power FETs, which are able to switch more efficiently at high frequencies.

Switching regulators may operate in multiple operating modes depending on the current requirements of the load ("load current"). For example, to handle normal or high load current conditions, a pulse width modulation (PWM) mode is commonly used to store the input energy. In this mode, the switching regulator outputs a series of pulses having pulse width that are adjusted to store the input energy to satisfy the required load current. To handle low load current conditions, a low power mode (LPM) of operation can be used where the switching regulator outputs a series of narrow pulses where one or more of the pulses may be skipped in order to meet the reduced load current requirements. This mode is referred to as pulse frequency modulation (PFM) or PFM mode of operation. In PFM, the frequency of the pulses and the duration of a burst of pulses can be adjusted to meet the required load current.

One reason for using the PFM mode in a switching regulator is to gain light load efficiency. Typically, a threshold is set that changes the mode of operation between the PWM and PFM modes. One technique is based on sensing the peak output current. Unfortunately, the methods to determine the average load current from the peak output current can be complicated if the accuracy of the output voltage has to be maintained.

It is therefore desirable to have a simple way to transition a switching regulator between operating modes to overcome the disadvantages of complex conventional circuits, while being able to adjust the threshold or the transition point easily. A more precise solution would improve performance while an architecturally simple solution would reduce or minimize the area and cost of the design.

SUMMARY

Current metering for transitioning to low power operation in switching regulators is disclosed. In exemplary embodiments, methods and apparatuses are provided to generate pulse width modulated charging cycles that enable current to flow to an inductor to adjust an output voltage. The methods and apparatuses also operate to detect skipped charging cycles and determine whether a selected number of charging cycles are skipped over a time interval that begins when the first skipped charging cycle is detected. If it determined that the selected number of charging cycles has been skipped over the selected time interval, a transition to a low power operating mode is performed. During the low power operating mode pulse frequency modulated charging cycles are generated that enable the current to flow to the inductor to generate the output voltage.

The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
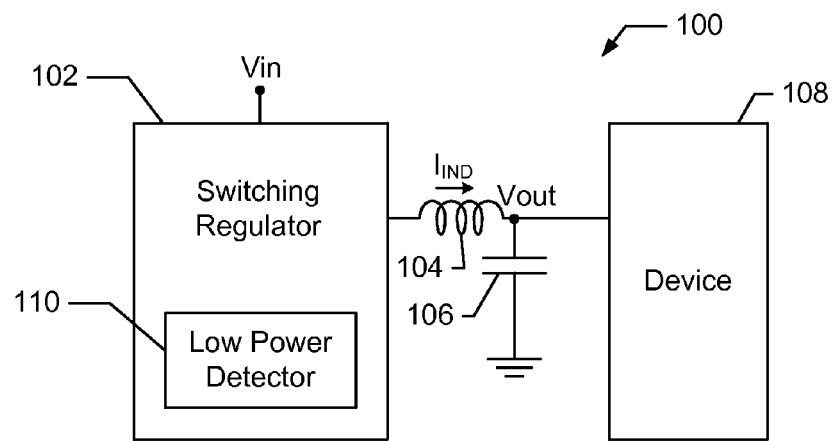
FIG. 1 shows a charging system that comprises an exemplary embodiment of a switching regulator having a low power detector to determine when the switching regulator should transition between PWM and PFM operating modes.

FIG. 1 shows a charging system 100 that comprises an exemplary embodiment of a switching regulator 102 having a low power detector 110 that determines when the switching regulator 102 should transition between PWM and PFM operating modes. In an exemplary embodiment, the switching regulator 102 is a buck converter but may also be any other type of switch mode regulator or battery charger. The switching regulator 102 operates to convert a DC input voltage (Vin) to a lower DC output voltage (Vout) (e.g., 5 volts) that can be used to operate or charge a device, such as device 108. For example, the device 108 may be a smartphone, tablet computer or other type of device. Using PWM or PFM charging cycles, the switching regulator 102 generates an inductor current ($I_{IND}$) that flows through an inductor 104 and charges a capacitor 106 to generate the output voltage (Vout). During normal operation, the switching regulator 102 uses PWM charging cycles and during low power operation the switching regulator uses PFM charging cycles to switch current to the inductor 104 to maintain the regulated output voltage.

In various exemplary embodiments, the low power detector 110 determines entry and exit into the Low Power Mode (LPM) of operation. For example, after normal operation using PWM charging cycles, the device 108 may be fully charged such that its power requirement drops to a lower level. The low power detector 110 detects this condition and transitions the switching regulator to the low power mode (or burst mode) that utilizes PFM charging cycles to switch current to the inductor 104 to efficiently maintain the regulated output voltage when the device's power requirements are low. The low power detector 110 also detects when the power requirements of the device 108 increase, and in response, transitions the switching regulator out of the LPM mode and back to the normal mode where PWM charging cycles are utilized to maintain the output voltage.

In an exemplary embodiment, the low power detector 110 performs threshold detection using a digital algorithm to detect "skipping" behavior of the switching regulator. In conjunction with the digital algorithm, analog signals are used to generate a scaling pulse width (referred to as the minimum on-time) that is proportional to the ideal duty cycle "d" of the switching regulator for given input and output voltages. In an exemplary embodiment, the digital algorithm combined with the analog circuitry operate to scale the minimum on-time of the switching regulator based on the output voltage to significantly simplify the process of detecting low power conditions. The system works seamlessly with minimal modifications and overhead in peak current controlled switching regulators.

Figure 2:
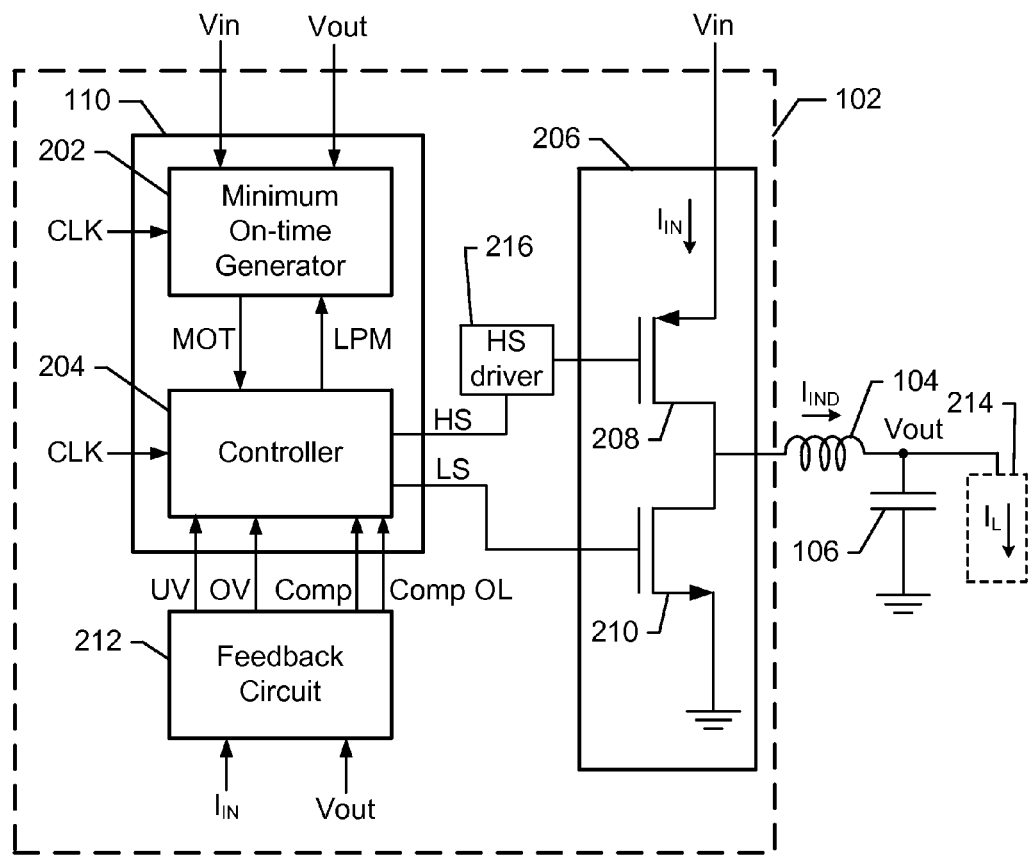
FIG. 2 shows a detailed exemplary embodiment of the switching regulator shown in FIG. 1.

FIG. 2 shows a detailed exemplary embodiment of the switching regulator 102 shown in FIG. 1. The switching regulator 102 comprises the low power detector 110, a power stage 206, and a feedback circuit 212. The low power detector 110 comprises a minimum on-time generator (MOT) 202 and a controller 204. The device 108 is represented by the load current ($I_L$) 214.

During operation, the controller 204 outputs high side (HS) and low side (LS) drive signals (during PWM and PFM charging cycles) that drive power transistors 208 and 210 of the power stage 206. In an exemplary embodiment, the HS signal output from the controller 204 is input to a HS driver 216 that drives the HS signal with the appropriate polarity to drive the transistor 208. As the transistors 208 and 210 are switched on and off, the inductor current $I_{IND}$ is generated, which charges the capacitor 106 to generate the output voltage (Vout). The controller 204 receives a clock (CLK) signal that sets the frequency of the HS and LS signals. The controller 204 adjusts the duty cycle of the HS and LS signals to control the amount of current that flows into the inductor 104 and thereby maintains regulation of the output voltage.

The MOT generator 202 receives the CLK, the input DC voltage and the generated output voltage (Vout). The MOT generator 202 generates a MOT signal from the signals it receives based on two scaling factors (k1 and k2). The MOT signal represents the minimum on-time for the HS FET 208 during normal mode (PWM) when factor K1 is used, and during the low power mode (PFM) when factor k2 is used. The MOT generator 202 receives a LPM indicator that is in a first state when the regulator is in the low power mode and a second state when the regulator is in the normal operating mode. In response to the LPM indicator, the MOT generator 202 uses the appropriate scaling factor to generate the MOT signal during the PWM and PFM charging cycles.

The feedback circuit 212 receives various analog signals related to the operation of the switching regulator and processes these signals to provide status indicators to the controller 204. The status indicators include an undervoltage (UV) indicator, an overvoltage (OV) indicator, a comparator output (Comp), and a comparator open loop output (Comp OL). Additional detailed descriptions of the components of the switching regulator 102 are provided below.

The minimum on-time (MOT) signal is proportional to the switching regulator on-time [d*T], where d is the ideal duty cycle [Vout/Vin] in case of the BUCK regulator and [(Vout−Vin)/Vin] in case of the BOOST regulator, and where T is the time period of the regulator (1/switching frequency). The minimum on-time is defined as the time when the switching regulator forces the high side (HS) device 208 to be kept in the on state. Keeping the HS FET on for at least the minimum on-time serves many purposes, one of which is to allow time for current sensing circuits to begin operation and settle down before selected feedback signals are used to make the decision of when the HS FET is to turned off. This is part of current mode feedback operation and the minimum on-time is chosen carefully to allow time for the current mode control loop to work in a peak current controlled regulator.

Figure 3:
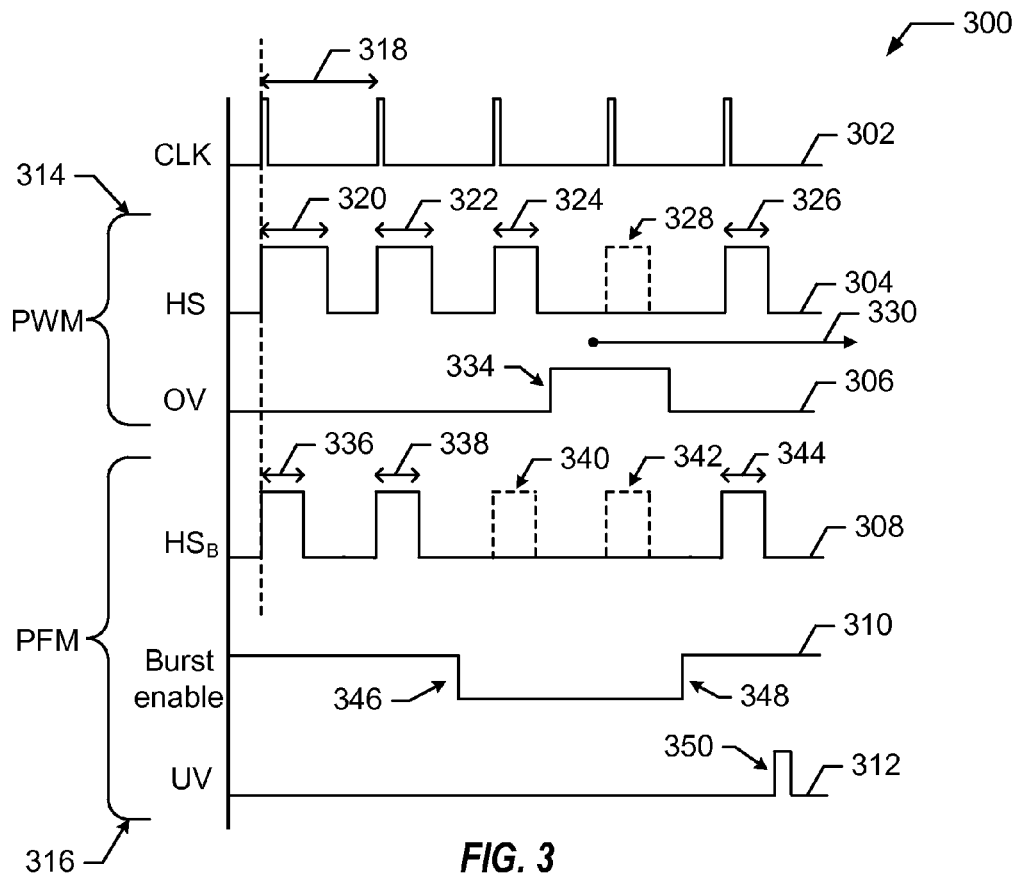
FIG. 3 shows exemplary timing diagrams that illustrate operation of the switching regulator shown in FIG. 1 during normal operation using PWM charging cycles and during low power operation using PFM (burst mode) charging cycles.

FIG. 3 shows exemplary timing diagrams 300 that illustrate the operation of the switching regulator 102 shown in FIG. 2 during normal power operation (314) using PWM charging cycles and low power operation (316) using PFM or "burst mode" charging cycles. The clock (CLK) signal 302 is input to the controller 102 as shown in FIG. 2 and sets the timing for the generation of the HS and LS signals. The CLK has a time period (T) 318 corresponding to its frequency, which in an exemplary embodiment is 2.25 MHz.

The HS signal 304 presented to the driver 216 during PWM has a rising edge with the CLK signal 302 and stays at a high level for a time interval 320 that indicates its duty cycle with respect to the CLK period. When the HS signal 304 is at a high level, the driver 216 drives the device 208 to turn on and current flows into the inductor 104. The controller 102 controls the amount of current flowing into the inductor by controlling the duty cycle or the time that the HS signal 304 is at its high level. As the power requirements of the load device decreases, the pulse width of the HS signal 304 is decreased (as shown at 322) until it reaches the minimum on-time, as shown at 324 that is determined by the MOT generator 202.

If the switching regulator continues to utilize PWM charging cycles and the load current requirements of the device remain low, an overvoltage (OV) condition may occur as shown at 334 of the OV signal 306. For example, even using the minimum on-time during the PWM charging cycles, the load current requirements are so low that the generated output voltage begins to rise and causes the overvoltage condition indicated at 334. In this case, the controller 204 may disable or (skip) one or more PWM charging cycles, as shown by the skipped cycle at 328. The skipped cycle(s) may be followed by one or more enabled cycles as shown at 326. This cycle skipping indicates discontinuous operation of the switching regulator (indicated at 330) where the load current requirements are satisfied before completion of the charging cycle resulting in overvoltage conditions. However, cycle skipping during the PWM mode is an indication of light load conditions such that it would be more efficient to operate in a low power mode using PFM charging cycles. The low power detector 110 detects the cycle skipping behavior during the PWM mode and operates to transition the switching regulator to the PFM mode for improved efficiency when a low power threshold is reached. In an exemplary embodiment, the threshold used to determine when operation of the regulator is transitioned to the low power mode is set to optimally control efficiency.

If the controller 204 determines that the threshold has been reached where it would be more efficient to operate the switching regulator in the PFM mode, a transition to the PFM mode (or low power mode) is performed. In the low power mode, the regulator 102 utilizes PFM charging cycles (burst mode) to control the amount of current flowing into the inductor 104. For example, in the PFM mode shown at 316, HS burst mode charging cycles ($HS_B$) are shown at 308. Each $HS_B$ cycle has a duration that is equal to the minimum on-time generated by the MOT generator 202. For example, the cycles 336 and 338 have durations equal to the minimum on-time. It should be noted that different scaling factors are utilized to determine the minimum on-time values during the PWM mode and the PFM mode. Thus, the minimum on-time used for cycle 336 is different from the minimum on-time used for cycle 324 during the PWM mode 314.

During low power operation using PFM charging cycles, an overvoltage condition may occur as shown by the transition 346 of a burst enable indicator 310. When an overvoltage condition is detected during the low power mode, one or more PFM charging cycles may be skipped, as indicated at 340 and 342. When the overvoltage condition ends, as indicated by the transition 348 of the burst enable 310, the burst mode PFM charging cycles are enabled again, as shown by cycle 344.

If the controller 204 determines that a threshold has been reached where it would be more efficient to operate the switching regulator in the PWM mode, a transition to the PWM mode (or normal mode) is performed. For example, if the load current requirements increase such that the PFM charging cycles are not able to meet the load current requirements, the output voltage will begin to fall. This is indicated by the event 350 of the undervoltage indicator 312. When the undervoltage event is detected, the low power detector transitions the operation of the switching regulator back to the normal mode of operation so that PWM charging cycles are used to meet increased current demands of the load. Thus, the duty cycle control can be handed off smoothly to the normal operation of the control loop to regulate the output voltage instead of using the MOT generator, which controls the duty cycle in the low power mode.

Figure 4:
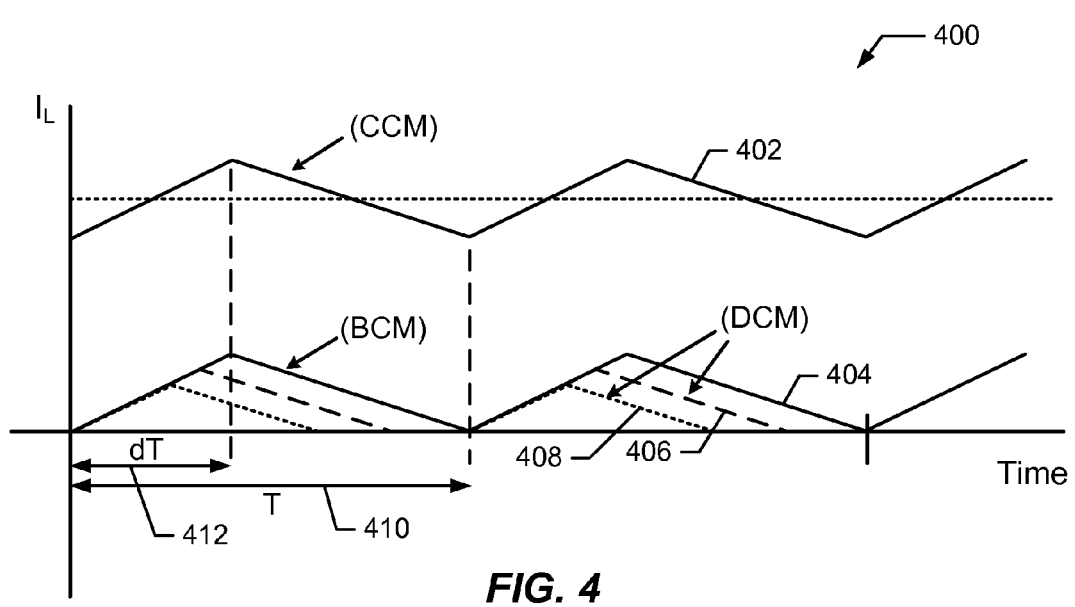
FIG. 4 shows exemplary waveforms illustrating load current ($I_L$) associated with the operation of the switching regulator shown in FIG. 2.

FIG. 4 shows exemplary waveforms 400 illustrating the operation of the switching regulator 102 shown in FIG. 2 for a given load current ($I_L$). The waveform 402 represents the load current during normal power operations in what is referred to as continuous conduction mode (CCM). The current waveform has a time period (T) shown at 410 that corresponds to the period of the clock signal. The rising edge of the current waveform 402 results when the controller 102 drives the HS signal to the high state for a time interval shown at 412, which represents the duty cycle (d) multiplied by the period T. The duty cycle (d) is a value in the range of 0 to 1.

As can be seen in FIG. 4, as load current decreases, a certain load current level is reached (indicated by current waveform 404) where the regulator begins to operate in borderline continuous mode (BCM) where the current requirements are just being met by the charging cycle of the switching regulator. Below this load level, the switching regulator operates in discontinuous mode (DCM), where the charging cycle of the switching regulator is providing more current than is required by the load, which results in overvoltage conditions that result in cycle skipping operation as indicated at 330 shown in FIG. 3. In general, these principles apply to both a boost and buck converter although the buck converter will be used for illustrations.

During borderline conduction mode, illustrated by the waveform 404, the load current drops to zero at the end of the time period T. During discontinuous conduction mode, shown by waveforms 406 and 408, the load current goes to zero before the end of the period T of the charging cycle.

As the average load current decreases and DCM operation begins, the HS on-time will decrease below the value of "dT". Beyond the BCM point, a decrease in load current directly translates to lower duty cycle operation but the duty cycle cannot be reduced indefinitely and will eventually be limited to the minimum on-time. As an example, the minimum on-time can be assigned the value 0.6*d*T. If load current decreases such that the required duty cycle is less than 0.6*d*T, then the regulator will start skipping cycles since the HS is forced to stay on for at least the minimum on-time of 0.6*d*T, which is longer than the required duty cycle. The duty cycle when averaged over skipped cycles should still be able to support the required load current. For example, five "on" cycles followed by one "off" (or skipped) cycle results in 5*0.6*d*T/6=0.5*d*T which is a little less than the minimum on-time.

In various exemplary embodiments the low power detector 110 detects when a particular threshold is met after the discontinuous mode is entered. At this time, a transition to the low power mode is performed wherein the regulator 102 utilizes PFM charging cycles to control the current that is switched to the inductor 104 to meet the load current requirements. The PFM mode continues until the load current requirements increase beyond that which can be supported by the PFM mode. The low power detector 110 determines this condition and transitions the switching regulator 102 back to the normal mode to utilize PWM charging cycles. Thus, as the load current changes, the regulator adjusts operation to meet the load current requirements very efficiently.

Figure 5:
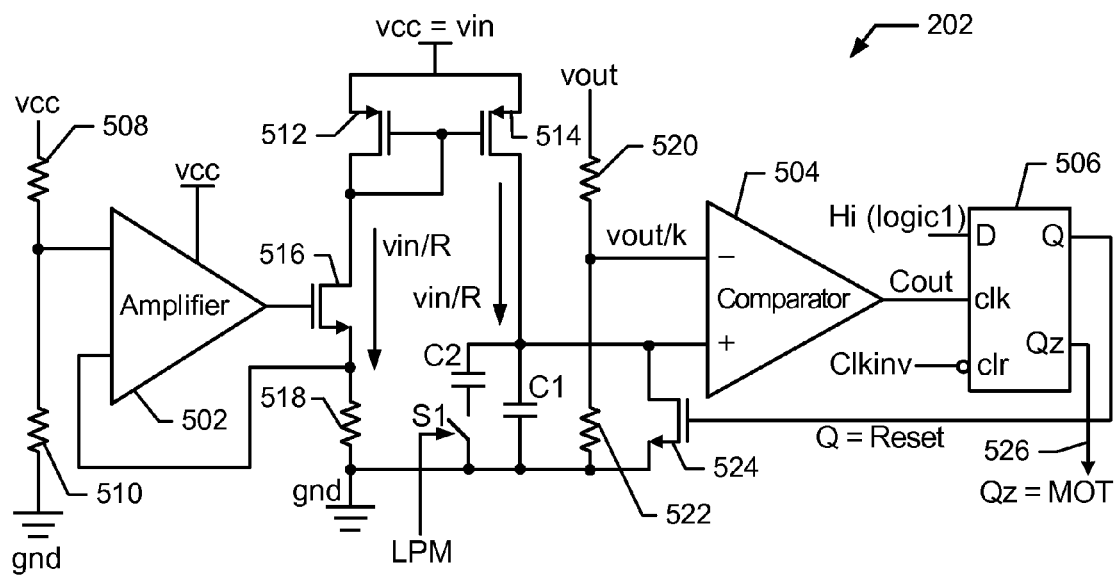
FIG. 5 shows an exemplary embodiment of a minimum on-time (MOT) generator for use with the low power detector shown in FIG. 2.

FIG. 5 shows an exemplary embodiment of the minimum on-time (MOT) generator 202 shown in FIG. 2. The MOT generator 202 comprises amplifier 502, comparator 504 and flip-flop 506. During operation, the resistors 508, 510 divider the input voltage (Vin) to produce a divided voltage that is input to the amplifier 502. The output of the amplifier 502 turns on the transistor 516 such that a current having a level of (Vin/R(518)) is generated and flows through the resistor 518. The generated current is mirrored by the transistors 512, 514 and the mirrored current flows into the capacitor C1.

A voltage generated by the current flowing into the capacitor C1 is input to the non-inverting terminal of the comparator 504. The resistors 520 and 522 divide the output voltage (Vout) of the regulator and the result is input to the inverting terminal of the comparator 504. When the voltage at its non-inverting terminal exceeds the voltage at its inverting terminal, the comparator 504 outputs a "Cout" signal that is input to the clock terminal of the flip-flop 506. The flip-flop 506 also receives a high level at its "D" input and an inverted clock signal (CLKinv) at its "clear" input. In an exemplary embodiment, the inverted clock signal (CLKinv) is generated by inverting the CLK signal that is input to the MOT generator 202 as shown in FIG. 2. In response to the Cout signal, the flip-flop 506 is clocked and outputs a "reset" signal from the "Q" output and the MOT signal 526 is output from its "inverted_Q" output. The reset signal is input to the transistor 524, which when enabled, discharges the capacitor C1. The capacitor C1 acts to set a first constant (k1) that is used to generate the MOT signal 526 that is used during PWM charging cycles.

An additional capacitor C2 is enabled into the circuit by a switch (S1) that is controlled by the LPM signal output from the controller 102. During the normal operating mode, the capacitor C1 is used to generate the MOT signal such that the MOT signal is determined from the expression (d*T*k1), where k1 is a constant determined by the capacitor C1. During LPM, the capacitor C2 is switched into the circuit and its capacitance value is added to that of C1 to increase the value of k1 to k2. Thus, during the low power mode, the MOT signal is determined from the expression (d*T*k2). By design k2 is a higher than k1, but both k1 & k2 are factors that are less than 1. For example, in an exemplary embodiment k2=0.8 and k1=0.6.

Thus, with a current that is proportional to the main input voltage and with a threshold voltage of the comparator that is proportional to the output voltage, a simple circuit operates to generate the MOT signal, which is proportional to "dT." Once the LPM mode is entered, the fraction k1 is increased to k2 to get the desired hysteresis. The new value (k2) is higher than the value (k1) and this allows the regulator to exit the LPM mode at a higher current level than when the LPM was entered and ensures some hysteresis.

Figure 6:
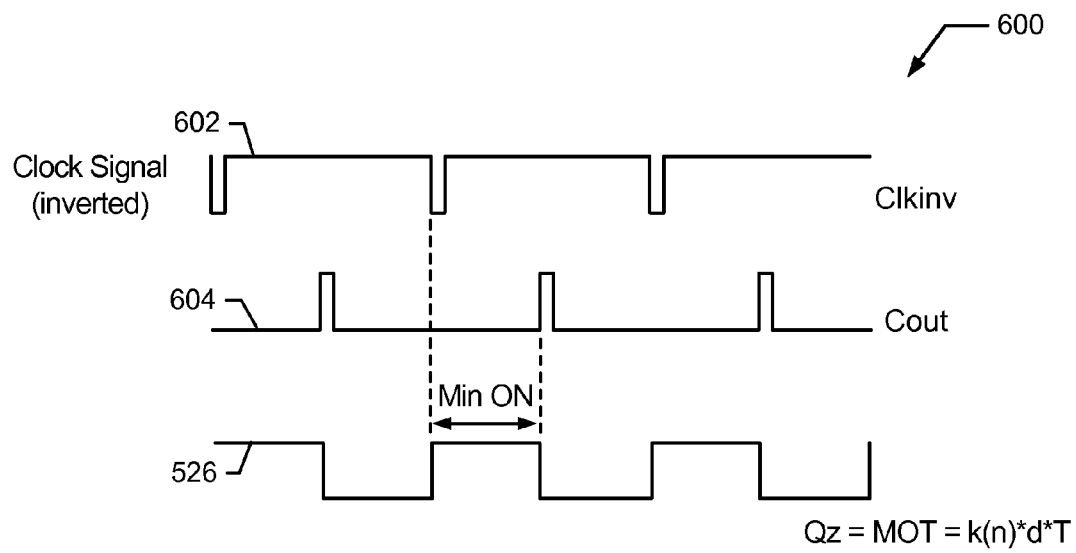
FIG. 6 shows a graph that illustrates exemplary signal timing of the MOT generator shown in FIG. 5.

FIG. 6 shows a graph 600 that illustrates exemplary signal timing of the MOT generator shown in FIG. 5. During operation, the inverted CLK signal 602 is received by the clear input of the flip-flop 506 and the transition of the CLK signal 602 from a high level to a low level operates to clear the flip-flop 506 and set the inverted Q output to the high state thereby setting the MOT signal 526 to the high state. Once the current charges the capacitor C1 (or C1+C2 in LPM) such that the voltage at the non-inverting input of the comparator 504 exceeds the voltage at the inverting input, the Cout signal 604 transitions to a high state, which clocks the flip-flop to reset the inverted Q output, thereby transitioning the MOT signal 526 to a low state. The Q output then transitions to the high state to switch on the transistor 524 to discharge the capacitor C1 (or C1+C2) for the next charging cycle.

Figure 7:
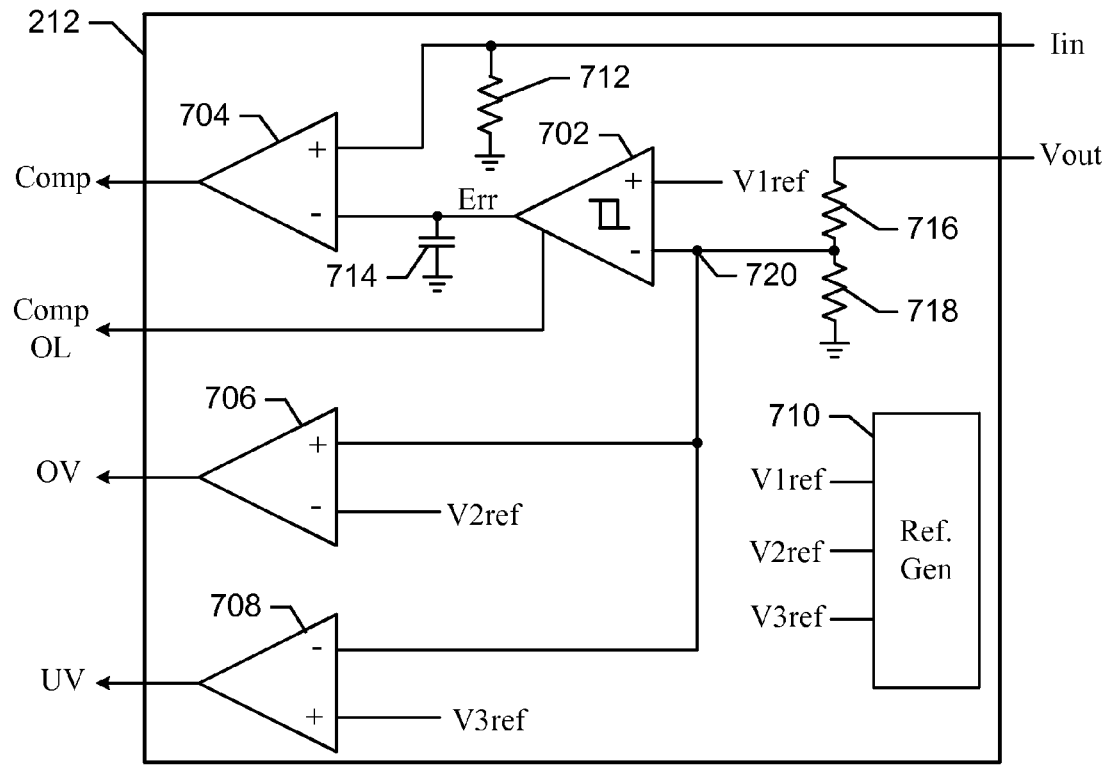
FIG. 7 shows a detailed exemplary embodiment of a feedback circuit shown in FIG. 2.

FIG. 7 shows a detailed exemplary embodiment of the feedback circuit 212. The feedback circuit 212 comprises error amplifier 702 and comparators 704, 706 and 708. The feedback circuit 212 also comprises reference voltage generator 710.

During operation, the Vout signal is divided by the resistors 716 and 718 to generate a divided Vout signal at node 720 that is input to the inverting input of the amplifier 702 and the comparator 708. The divided Vout signal at node 720 also is input to the non-inverting input of the comparator 706 and the inverting input of the comparator 708. The reference generator 710 generates voltage references V1ref, V2ref, and V3ref that are input to the amplifier 702 and the comparators 706 and 708 as shown.

By comparing the divided Vout signal at node 720 to the V2ref, the comparator 706 generates the overvoltage (OV) signal. In an exemplary embodiment, the amplifier 702 provides hysteresis to prevent rapid changes of its output when the voltage at node 720 is close to the V1ref voltage. By comparing the divided Vout signal at node 720 to the V3ref, the comparator 708 generates the undervoltage signal (UV). The amplifier 702 amplifies the difference between the divided Vout signal at node 720 and the V1ref voltage to generate an error (err) voltage that charges the capacitor 714 at the inverting input to the comparator 704. The error amplifier 702 also includes an open loop output (Comp OL) that is output from the feedback circuit 212. The Comp OL signal is used to provide for reduce power utilization and is further discussed below. The input current (Iin) is received by the resistor 712 to generate a voltage that is input to the non-inverting input of the comparator 704. The comparator 704 compares the voltage signals at its inputs to generate a comparator output (Comp) signal.

Figure 8:
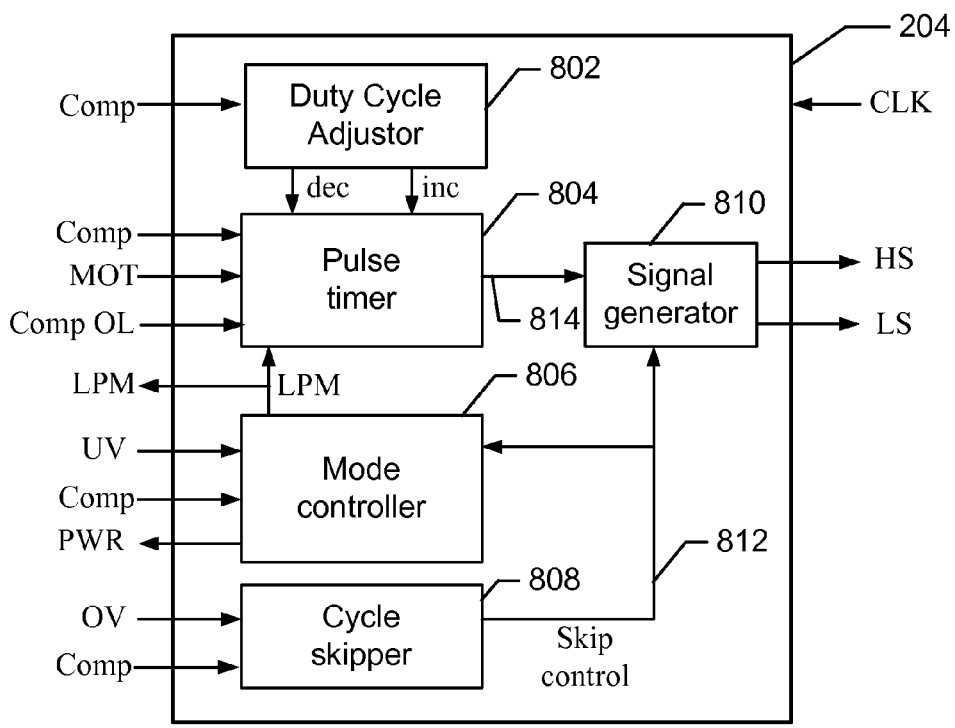
FIG. 8 shows a detailed exemplary embodiment of a controller shown in FIG. 2.

FIG. 8 shows a detailed exemplary embodiment of the controller 204. The controller 204 comprises a duty cycle adjustor 802, a pulse timer 804, a mode controller 806, a cycle skipper 808 and a signal generator 810. In an exemplary embodiment, the controller 204 receives a system clock (CLK) signal that is distributed to the components of the controller 204 and operates to synchronize the operation of the components of the controller 204.

The duty cycle adjustor 802 comprises analog and/or digital circuitry that receives the Comp signal from the feedback circuit 212 and outputs increase (inc) and decrease (dec) signals to the pulse timer 804. The inc signal indicate that the HS pulse width is to be increased and the dec signal indicates that the HS pulse width is to be decreased so as to maintain output voltage regulation in response to load conditions. In an exemplary embodiment, the duty cycle adjustor 802 compares the Comp signal to a threshold and if the Comp signal is above the threshold, the dec signal is output. If the Comp signal is equal to or below the threshold the inc signal is output.

The pulse timer 804 comprises analog and/or digital circuitry that receives the MOT signal 526 from the MOT generator 202. The pulse timer 804 also receives the inc and dec signals from duty cycle adjustor 802 and a low power mode (LPM) indicator from the mode controller 806. During operation, the pulse timer outputs a timing signal 814 to the signal generator 810. The timing signal 814 indicates the timing of the HS and LS drive signals for the next power cycle. For example, the timing signal 814 comprising timing characteristics (e.g., pulse width, voltage level, or other characteristics) that indicate how long the HS drive signal is to be enabled (high level).

In an exemplary embodiment, the pulse timer 804 uses the inc and dec signals to change the timing characteristics of the timing signal 814 to cause the signal generator 810 to increase or a decrease the pulse width of the HS drive signal. The pulse timer 804 uses the MOT signal to determine the minimum on-time of the HS drive signal. Therefore, the MOT signal is used by the pulse timer to set the timing characteristics of the timing signal 814 to cause the signal generator to output the HS drive signal with a minimum on-time. The Comp OL signal is used by the pulse timer 804 to achieve low power consumption and is explained in greater detail below.

The signal generator 810 comprises analog and/or digital circuitry that receives the timing signal 814 and outputs the HS and LS driver signals that have timing based on the received timing signal 814. For example, in an exemplary embodiment, the signal generator 810 interprets the timing characteristics of the timing signal 814 and generates the HS and LS signals bases on these timing characteristics. For example, the pulse width of the HS signal may be increased based on an increase in voltage level of the timing signal 814. The signal generator 810 also receives the skip control signal 812 from the cycle skipper and determines whether or not to output the next cycle of the HS and LS signals based on the skip control signal 812. For example, if the skip control signal is at a low voltage level, then the next cycle of the HS and LS signals will be output with the appropriate timing as determined by the timing signal 814. If the skip control signal is at a high voltage level, then the next cycle of the HS and LS signals will be skipped and will not be output from the signal generator 810.

The cycle skipper 808 comprises analog and/or digital circuitry that receives the overvoltage (OV) signal and the Comp signal from the feedback circuit 212 and outputs the skip control signal 812. The skip control signal 812 is input to the mode controller 806 and the signal generator 810. The skip control signal 812 controls the signal generator 810 to skip a power cycle by disabling output of the HS and LS signals. In an exemplary embodiment, when either the OV signal or the Comp signal are in a selected state, the cycle skipper 808 operates to output the skip control signal 812 to cause the signal generator 810 to skip the next power cycle. The skip control signal 812 is input to the mode controller 806, which monitors when power cycles are skipped.

The mode controller 806 comprises analog and/or digital circuitry that receives the undervoltage (UV) signal and the skip control signal 812 and generates the low power mode (LPM) signal that indicates the mode of the switching regulator. In an exemplary embodiment, the mode controller 806 includes registers, counters, a processor or CPU, gate array or other suitable circuitry that operates to perform logic, arithmetic, and/or control functions.

During operation in the normal PWM mode, the mode controller 806 outputs the LPM signal in a selected state to indicate the normal PWM operating mode. The pulse timer 804 outputs the timing signal 814 to control the timing of the HS and LS pulse widths. The duty cycle adjustor 802 receives the Comp signal and generates the inc and dec signals to indicator how the HS and LS pulse widths are to be adjusted to maintain the desired output voltage from the switching regulator. For example, as the load current requirement decreases, the duty cycle adjustor 802 outputs the dec signal to the pulse timer 804, which in response, outputs the timing signal 814 to decrease the HS pulse width that is output from the signal generator 810. However, the pulse timer 804 will not adjust the HS pulse width to be less than the received MOT signal.

As the load current requirements continue to decrease, the OV signal or the Comp signal (pulses are also skipped as soon as the output voltage is higher than the nominal target even if it has not reached OV levels) will be enabled and cause the cycle skipper 808 to output the skip control signal 812 to cause the signal generator 810 to skip one or more PWM cycles. The mode controller 806 receives the skip control signal 812 and performs an algorithm to determine when a transition to the low power mode is necessary. When the conditions of the algorithm are met, the mode controller 806 outputs the LPM signal in a state that indicates a transition to the low power mode. The pulse timer 804 receives this transition and begins operation in the low power mode using PFM charging cycles. The MOT generator 202 shown in FIG. 5 also receives the LPM signal and enables capacitor C2 into the circuit to set the MOT factor to k2.

During operation in the low power mode, the pulse timer 804 outputs the timing signal 814 to enable the HS drive signal duration to be equal to the received MOT signal. The pulse timer 804 ignores the dec and inc inputs from the duty cycle adjustor 802. The cycle skipper receives the overvoltage (OV) signal or the Comp signal that indicates when the output voltage is higher or lower than the desired target, and in response, outputs the skip control 812 signal to skip the next charging cycle when detected. This operation continues until the load current requirements increase and the burst mode cycles are unable to maintain the output voltage at the desired level. This condition is indicated by the undervoltage signal (UV) that is input to the mode controller 806. When the UV signal is active, the mode controller 806 operates to switch the mode to the normal PWM mode and changes the state of the LPM signal to the normal PWM state. The components of the controller 204 then operate in the PWM mode as described above. Additional descriptions of the operation of the controller 204 are provided below.

Figure 9:
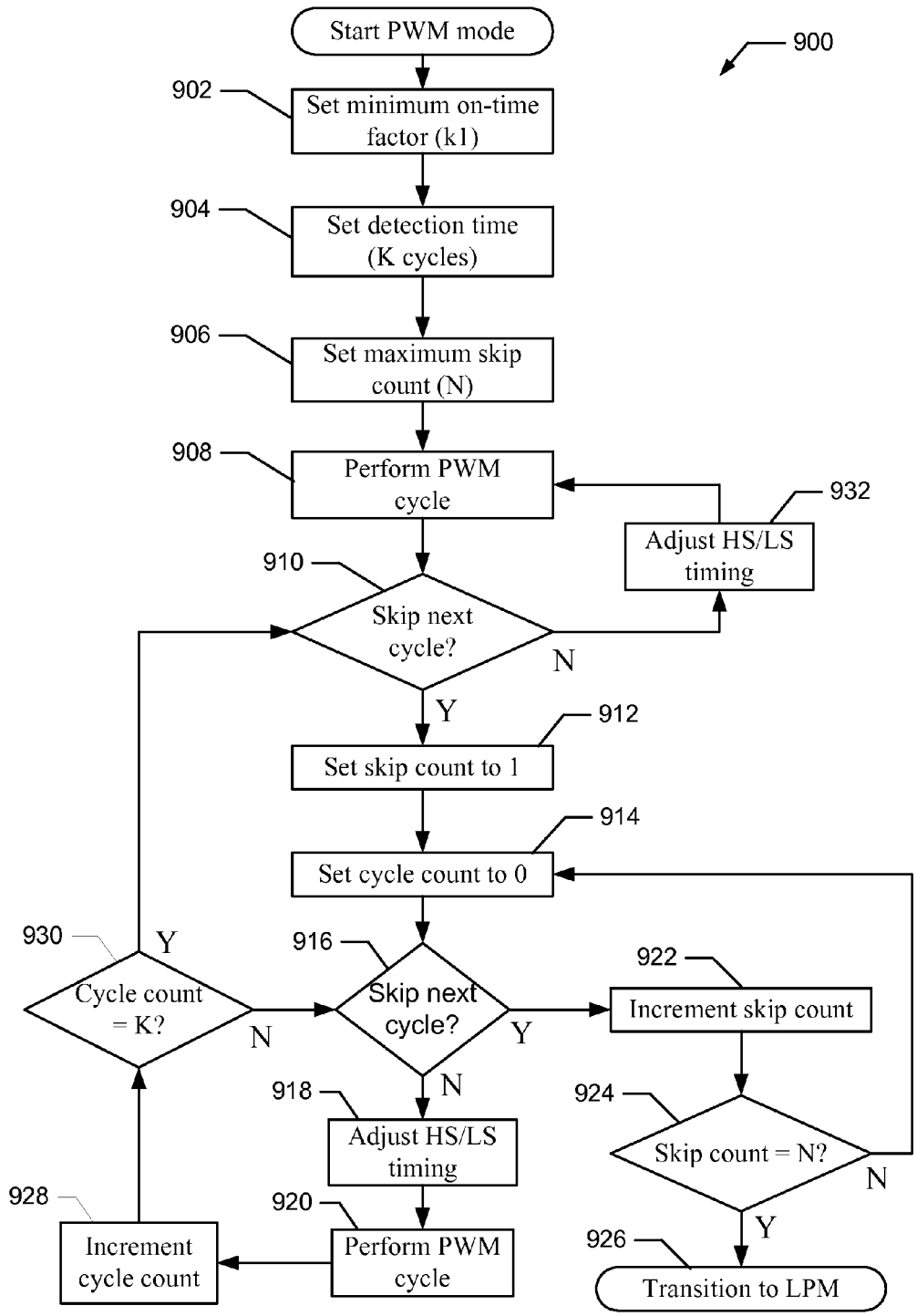
FIG. 9 shows an exemplary embodiment of a method for detecting a threshold and transitioning from a normal operating mode to a low power operating mode for use with exemplary embodiments of the switching regulator shown in FIG. 2.

FIG. 9 shows an exemplary embodiment of a method 900 for detecting a threshold and transitioning from a normal operating mode to a low power operating mode for use with exemplary embodiments of the switching regulator 102 and low power detector 110 shown in FIG. 2.

At block 902, a minimum on-time factor of k1 is set. For example, the mode controller 806 outputs the LPM signal set to a first state to indicate normal (PWM) operation and to control the switch S1 to open and thereby disconnect the capacitor C2 from the MOT generator 202 circuit. Thus, the capacitor C1 generates the factor k1 that is used to determine the timing of the MOT signal.

At block 904, a detection time interval is set. For example, the mode controller 806 comprises a register that stores a cycle count value that determines the detection time interval.

In an exemplary embodiment, the register is preloaded with a value of "K" representing a number of charging cycles that determines the detection time. In another embodiment, the mode controller 806 stores the value in the register during start-up operation. In an exemplary embodiment, the value of K is set to a value of 8 to indicate that the detection time is set to 8 charging cycles; however, other values of K can be used.

At block 906, a maximum skip count is set. For example, the mode controller 806 comprises a register that stores a maximum skip count value that determines the maximum number of skipped cycles to be detected. In an exemplary embodiment, the register is preloaded with a value of "N" representing the maximum number of skipped cycles. In another embodiment, the mode controller 806 stores the value in the register during operation. In an exemplary embodiment, the value of N is set to 16 to indicate that 16 skipped cycles will be counted before transitioning to the low power mode. It should be noted that other values of N can be used.

At block 908, the controller 204 operates in a normal mode to generate a pulse width modulation (PWM) charging cycle to maintain an output voltage at a desired level. For example, the signal generator 810 generates the HS signal to have a pulse width set to drive current into the inductor 104 to provide the appropriate output voltage (Vout). The signal generator 810 generates the HS signal with an on-time that is adjusted to meet the changing load current requirements. In an exemplary embodiment, the duty cycle adjustor 802 receives the Comp signal and generates the inc or dec signals as necessary to increase or decrease the pulse width of the HS signal to maintain the desired output voltage. The pulse timer 804 receives the inc and dec signals and uses these signals to generate the timing signal 814 with the appropriate timing characteristics that are used by the signal generator 810 to determine the pulse widths of the HS and LS signals. However, pulse timer 804 also uses the received MOT signal to assure that the HS signal will have a minimum on-time determined by the MOT generator 202 with the switch S1 in the open state so that capacitor C1 provides a factor of k1 that is used to determine the minimum on-time.

At block 910, a determination is made as to whether the next PWM cycle will be skipped. For example, the cycle skipper 808 determines whether or not to skip the next PWM charging cycle based on the status of the overvoltage (OV) signal or the Comp signal. For example, if the power required by the charging device is low such that discontinuous mode is entered, the previous charging cycle may have resulted in an overvoltage condition such that the OV signal is generated. In another embodiment, the previous charging cycle may have created a condition where the output is slightly higher than the target voltage and which is detected and indicated by the Comp signal. The Comp signal and/or the OV signal indicate whether or not the next charging cycle is to be skipped. If the cycle skipper 808 evaluates the Comp signal or the OV signal and determines that the next charging cycle will not be skipped, the method proceeds to block 932. If the cycle skipper 808 determines that next charging cycle is to be skipped, the method proceeds to block 912 and the next charging cycle is skipped. To skip the cycle, the cycle skipper 808 outputs the skip control signal 812 to the signal generator 810, which uses the skip control signal 812 to disable the output of the HS and LS signals for the next charging cycle. The skip control signal 812 is also input to the mode controller 806 so that the mode controller 806 is made aware that the cycle was skipped and can update its registers appropriately.

At block 932, the timing of the next charging cycle is determined. For example, the duty cycle adjustor 802 receives the Comp signal and generates inc or dec signals as necessary that are input to the pulse timer 804. The pulse timer 804 uses the dec and inc signals to generate the timing signal 814 that increases or decreases the pulse width of the HS/LS signals to maintain the desired output voltage. However, the pulse timer 804 assures that the HS signal will have at least a minimum on-time determined by the MOT signal generated by the MOT generator 202 with the switch S1 in the open state so that capacitor C1 provides a factor of k1 to determine the minimum on-time. The method then proceeds to block 908 to perform the next PWM charging cycle.

At block 912, a skip counter is set to an initial value of one. For example, the mode controller 806 comprises a register that stores a skip count value that is set to the value of 1 in response to the cycle that is to be skipped.

At block 914, a cycle counter is set to an initial value of 0. For example, the mode controller 806 comprises a register that stores a cycle count value that is set to a value of 0.

At block 916, a determination is made as to whether the next PWM cycle will be skipped. For example, the cycle skipper 808 determines whether or not to skip the next PWM charging cycle based on the status of the overvoltage (OV) signal or Comp signal as discussed at block 910. If the next charging cycle will not be skipped, the method proceeds to block 918 to perform the next charging cycle. If the next charging cycle is to be skipped, the method proceeds to block 922 to skip the next charging cycle. To skip the cycle, the cycle skipper 808 outputs the skip control signal 812 to the signal generator 810, which uses the skip control signal 812 to disable the output of the HS and LS signals. The skip control signal 812 is also input to the mode controller 806 so that the mode controller 806 is made aware that the cycle was skipped.

At block 918, the timing of the next charging cycle is determined. For example, the duty cycle adjustor 802 receives the Comp signal and generates inc or dec signals as necessary to increase or decrease the pulse width of the HS signal to maintain the desired output voltage as described with reference to block 932. However, the HS signal will have a minimum on-time determined by the MOT generator 202 with the switch S1 in the open state so that capacitor C1 provides a factor of k1 to determine the minimum on-time. The method then proceeds to block 920 to perform the next PWM charging cycle.

At block 920, the controller 204 operates in a normal PWM mode to generate a pulse width modulation charging cycle to maintain an output voltage at a desired level. For example, the pulse timer 804 outputs the timing signal 814 based on the inc and dec signals and the signal generator 810 generates the HS and LS signals based on the timing signal 814. The pulse timer 804 determines the timing signal 814 such that the HS signal will have a pulse width set to at least the minimum on-time using factor k1 to drive current into the inductor 104 to provide the appropriate output voltage (Vout).

At block 928, the cycle counter is incremented to indicate the current cycle count. For example, the mode controller 806 increments its register containing the current cycle count.

At block 930, a determination is made as to whether the cycle count is equal to the maximum value of K. For example, the mode controller 806 makes this determination by comparing its internal registers related to the maximum cycle count and current cycle count. If the cycle count is not equal to the maximum value of K, the method proceeds to block 916. In this case, the method continues to determine whether enough cycles are skipped within the set detection time to cause a transition to the low power mode. If the cycle count is equal to the maximum value of K, the method proceeds to block 910. In this case, the detection time has expired and the method proceeds to block 910 to determine if the next charging cycle is to be skipped, after which a new detection time window will be activated.

At block 922, the skip counter is incremented. For example, the mode controller 806 increments its internal register containing the current skip count.

At block 924, a determination is made as to whether the skip counter is equal to the maximum value N. For example, the mode controller 806 makes this determination by comparing its internal registers related to the maximum skip count and the current skip count. If the current skip counter is not equal to the maximum value of N, the method proceeds to block 914. If the skip counter is equal to the maximum value of N, the method proceeds to block 926 where a transition to the low power mode occurs. For example, the required number of skipped cycles has been detected within the set detection time interval and as a result, the low power mode is entered.

Accordingly, the switching regulator 102 is configured to perform the operations of the method 900 described above. It should be noted that the operations of the method 900 are exemplary and that minor changes, modifications, rearrangements and other changes to the operations are within the scope of the exemplary embodiments.

Using the method 900, it is possible to determine when the average load current cannot be supported with only turning the HS device on for the minimum on-time for every charging cycle. When the regulator starts skipping cycles the above operations calculate the required duty cycle for a given load current. This is possible since the average on-time of the regulator is directly proportional to the average load current in DCM operation.

In continuous mode operation (CCM) the HS FET will turn on every charging cycle and there will be no skipped cycles. In DCM operation, skipped cycles are possible and these are detected when the inductor current waveform is non-periodic. By arming itself on encountering a skipped cycle and checking the next 8 charging cycles for another skipped cycle, the regulator starts detecting skipping behavior. If no charging cycles are skipped before the next 8 charging cycles complete, then the skip count is reset. If a skipped cycle is encountered before 8 clock cycles, then the skip count is incremented and the regulator continues to count and detect the next 8 clock cycles. When the skip count reaches 16, a transition to the low power mode occurs as the load is light enough to be supported with PFM (burst mode) operation.

If the wait time after a skipped cycle is increased to 16 clock cycles such that the skip count will continue to increase if a skip cycle is encountered within 16 cycles of the previous skipped cycle, then the duty cycle threshold for entering the low power mode is set to $(15/16*0.6*d*T)$, which is even closer to $(0.6*d*T)$. Accordingly, the threshold to enter low power mode is accurately set as a function of the duty cycle and by conjunction as a function of the average output load current.

Figure 10:
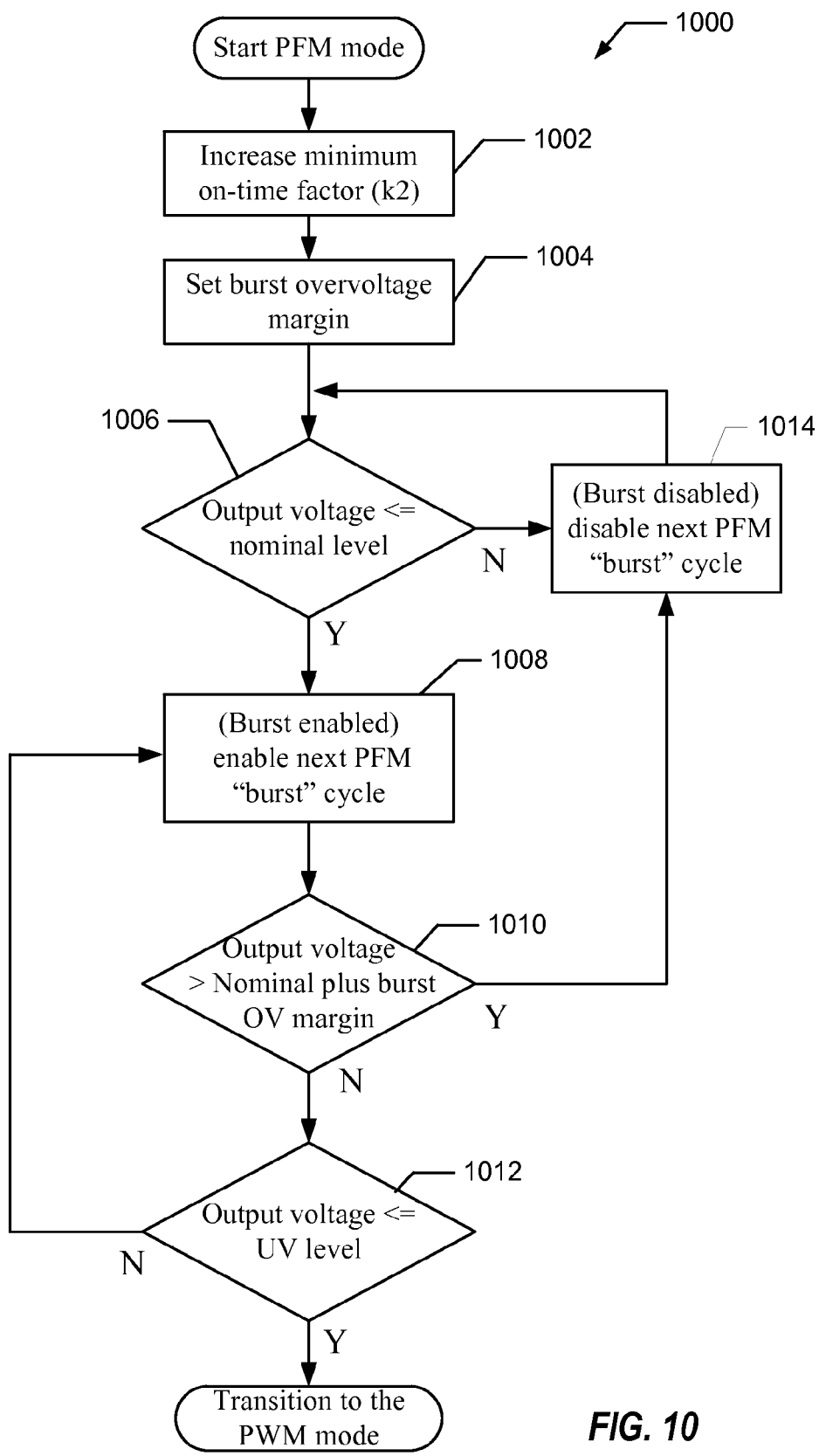
FIG. 10 shows an exemplary embodiment of a method for transition from the low power operating mode to the normal operating mode for use with exemplary embodiments of the switching regulator and low power detector shown in FIG. 2.

FIG. 10 shows an exemplary embodiment of a method 1000 for transition from the low power operating mode to the normal operating mode for use with exemplary embodiments of the switching regulator 102 and low power detector 110 shown in FIG. 2. For example, in an exemplary embodiment, the controller 204 performs the operations of the method 1000 to detect a threshold that determines when a transition from the low power operating mode to the normal operating mode is to occur.

At block 1002, a minimum on-time constant value is increased from k1 to k2. For example, the mode controller 806 outputs a selected state of the LPM signal to the MOT generator 202 to control the switch S1 to close thereby enabling the capacitor C2 into the circuit. The combination of capacitor C1 and C2 result in the constant value being increased k2.

At block 1004, a burst mode overvoltage margin is set. For example, the mode controller 806 comprises a register that stores the burst mode overvoltage margin, which in an exemplary embodiment is 0.5% of the nominal output voltage. In another exemplary embodiment, the overvoltage margin is set into the V2ref signal such that the comparator 706 detects the overvoltage condition with the appropriate margin setting.

At block 1006, a determination is made as to whether the output voltage from the regulator is less than or equal to the nominal voltage level. For example, when the output voltage (Vout) is at or below the nominal value (regulated value, e.g., 5 volts), the method proceeds to block 1008. For example, the Comp signal indicates this state. If the output voltage is not less than or equal to the nominal voltage level, the method proceeds to block 1014.

At block 1014, the next burst mode cycle is disabled. For example, the cycle skipper 808 detects the state of the Comp signal and outputs the skip control signal 812 to cause the signal generator 810 to disable the output of the HS and LS signals. Thus, the next PFM burst cycle is disabled.

At block 1008, the next PFM burst mode cycle is enabled. For example, the cycle skipper 808 outputs the skip control signal 812 to indicate that the signal generator 810 is to enable output of the HS and LS signals in a PFM burst cycle. During the PFM burst cycle, the pulse timer 804 receives the MOT signal that is generated with the constant k2, and uses this signal to generate the timing signal 814 that is input to the signal generator 810. The timing signal 814 controls the signal generator 810 to output the HS signal with an on-time equal to the minimum on-time indicated by the MOT signal. Thus, the PFM burst cycle has a minimum on-time of $(d*T*k2)$ and a HS pulse having the minimum on-time of $(d*T*k2)$ is output.

At block 1010, a determination is made as to whether the output voltage is greater than the nominal voltage plus the OV margin voltage. For example, the cycle skipper 808 determines when the voltage increases to a set percentage higher than the regulated output voltage (e.g., 0.5% higher). For example, the cycle skipper 808 detects the state of the OV signal. When this occurs, the method proceeds to block 1014 where the next PFM burst cycle is disabled and this will continue until the output voltage bleeds down to a level close to the regulated value (nominal value) as a result of the output load. Thus, if the output voltage is greater than the nominal voltage plus the OV margin, the method proceeds to block 1014. If the output voltage is not greater than the nominal voltage plus the OV margin, the method proceeds to block 1012.

During operation 1012, a determination is made as to whether the output voltage is less than or equal to the undervoltage level. For example, the output voltage may be less than the undervoltage level if the output voltage cannot be sustained while bursting with a minimum on-time of (d*T*k2). The output voltage drifts down since the load current will be higher than what can be supported by continuously bursting with the minimum on-time. If the mode controller 806 determines that the output voltage is not less than or equal to the undervoltage level, then the method proceeds to block 1008 to perform another burst mode cycle. If it is determined that the output voltage is less than or equal to the undervoltage level, then the output voltage has drifted down to the undervoltage level (UV). The mode controller 806 causes operation to exit the low power mode (burst mode) and transition to normal operation utilizing PWM. For example, the mode controller 806 outputs the LPM signal to indicate a transition to the normal PWM mode. At the start of the PWM mode, the minimum on-time is reset back to (d*T*k1) (lower than when in burst mode to create hysteresis). When back in regular operation, the regulator uses the current sensing mechanism and full current mode feedback control loop to regulate instead of always bursting with the minimum on-time of (d*T*k2).

The exit threshold of the LPM mode is accurately set as a function of average duty cycle in DCM; this is when the load current is higher than what can be supported by bursting with a minimum on-time of (d*T*k2). The threshold is therefore set also as a function of average load current. The low power mode continues until the load current increases to a level that needs the duty cycle of the regulator to be higher than the minimum on-time of (d*T*k2). At this point, operation transitions to the normal operating mode.

Accordingly, the low power detector 110 performs the operations of the method 1000 described above. It should be noted that the operations of the method 1000 are exemplary and that minor changes, modifications, rearrangements and other changes to the operations are within the scope of the exemplary embodiments.

Low Power Consumption Mode

Figure 11:
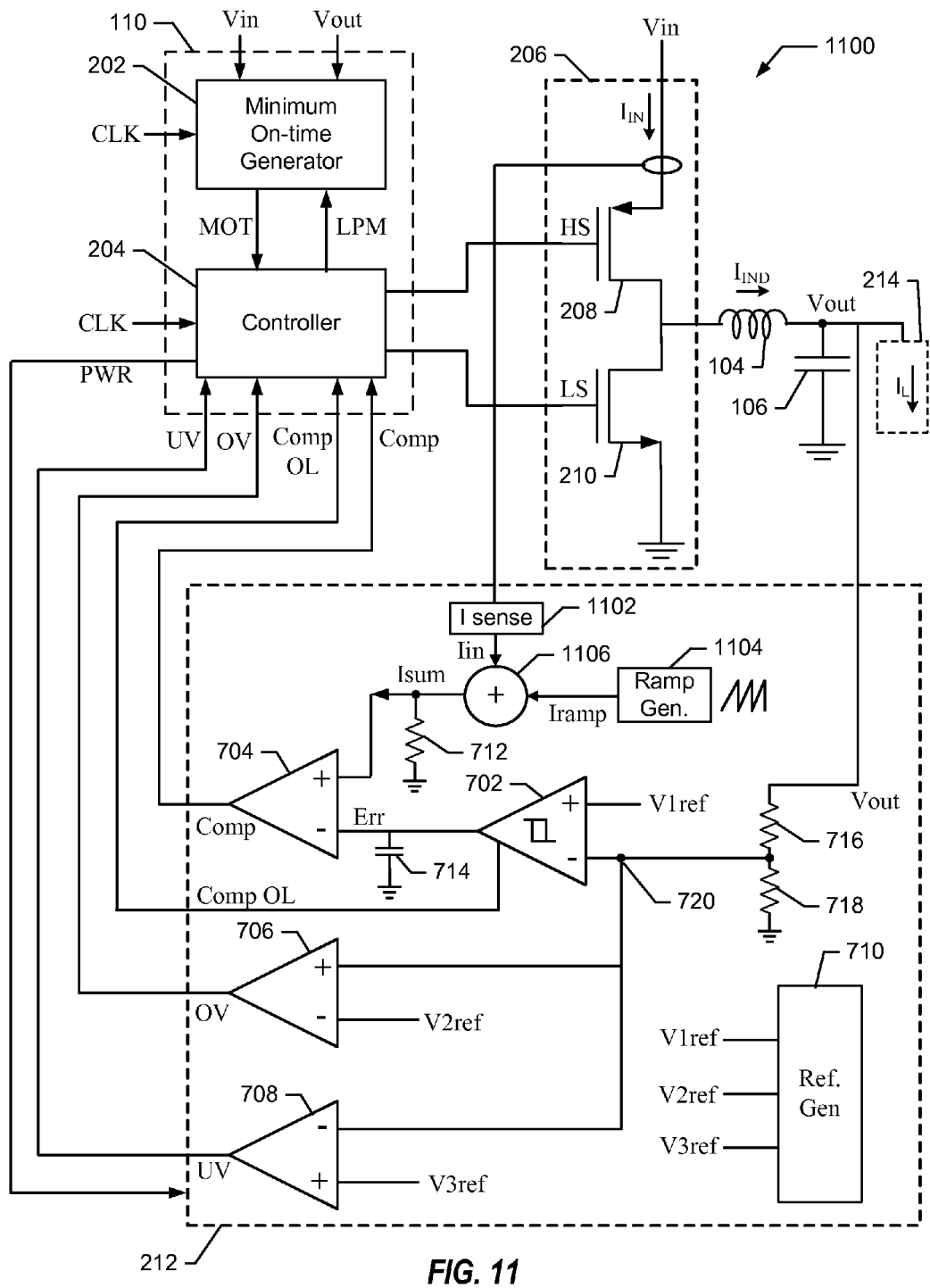
FIG. 11 shows a detailed exemplary embodiment of a switching regulator that illustrates how a power control loop can be controlled for low power consumption.

FIG. 11 shows a detailed exemplary embodiment of a switching regulator 1100 that comprises a power control loop that can be controlled for low power consumption. In an exemplary embodiment, the regulator 1100 is suitable for use as the switching regulator 102 shown in FIG. 1. The switching regulator 1100 comprises the low power detector 110, power stage 206, and feedback circuit 212. The low power detector 110 comprises the minimum on-time generator (MOT) 202 and the controller 204.

The feedback circuit 212 includes a current sense amplifier 1102, ramp current generator 1104, and current summer 1106. The current sense amplifier 1102 senses the input current and generates an input current signal (Iin) into the current summer 1106. The ramp current generator 1104 outputs a ramp current (Iramp) that is also input to the current summer 1106. A summed current signal (Isum) output from the current summer 1106 represents a summation of the En and Iramp currents. The current signal Isum is converted to a voltage by the resistor 712 and that voltage is input to the comparator 704.

In an exemplary embodiment, the controller 204 outputs the power control signal (PWR) that indicates whether a low power consumption mode is to be utilized. For example, the PWR signal is output from the mode controller 806. The PWR signal is input to the feedback circuit 212 and operates to enable or disable one or more of the functional elements of the feedback circuit to reduce power consumption. For example, the PWR signal can individually enable or disable the operation of any of the comparators 704, 706, 708, the current sense circuit 1102, the ramp current circuit 1104 and the summer circuit 1106.

During operation, the controller 204 outputs high side (HS) and low side (LS) drive signals (during PWM and PFM charging cycles) that drive power transistors 208 and 210 of the power stage 206. In an exemplary embodiment, the HS signal output from the controller 204 is input to a HS driver 216 that drives the HS signal with the appropriate polarity to drive the transistor 208. As the transistors 208 and 210 are switched on and off, the inductor current $I_{IND}$ is generated, which charges the capacitor 106 to generate the output voltage (Vout). The controller 204 receives a clock (CLK) signal that sets the frequency of the HS and LS signals.

A control loop is formed by the control 204, power stage 206 and the feedback circuit 212. Thus, the controller 204 adjusts the duty cycle of the HS and LS signals to control the amount of current that flows into the inductor 104. The signals Iin and Vout are input to the feedback circuit 212, which uses theses signals to generate the UV, OV, Comp and Comp OL signals that are input to the controller 204. The controller 204 uses these signals to adjust the HS and LS signals to maintain regulation of the output voltage as the load current changes. Thus, the control loop operates to continuously adjust the regulator to meet changing load current.

In an exemplary embodiment, the control loop can be configured for low power consumption. For example, the controller 204 outputs the PWR signal to selectively disable one or more elements of the feedback circuit 212. For example, the PWR signal can be configured to disable the comparators 704 and 706, the Isense circuit 1102 and the ramp generator 1104. Thus, the amplifier 702, comparator 708 and reference voltage generator 710 remain enabled. In this configuration, the control loop is formed by connection of the Vout signal to the amplifier 702 and the connection of the Comp OL signal to the controller 204.

This configuration results in lower power consumption since many of the functional elements of the feedback circuit 212 are disabled. This configuration also results in the amplifier 702 being used as a comparator, since the open loop output of the amplifier 702 is input to the controller 204 and is used to adjust the timing of the HS and LS signals. In an exemplary embodiment, the amplifier 702 still operates to maintain its bias point at the capacitor 714 as the regulator adjusts. Thus, when the regulator returns to normal PWM operation, the remaining elements of the feedback circuit are enabled and the amplifier 702 returns to amplification mode without having to change its signal biasing. Additional detailed descriptions of the switching regulator 1100 are provided below.

Figure 12:
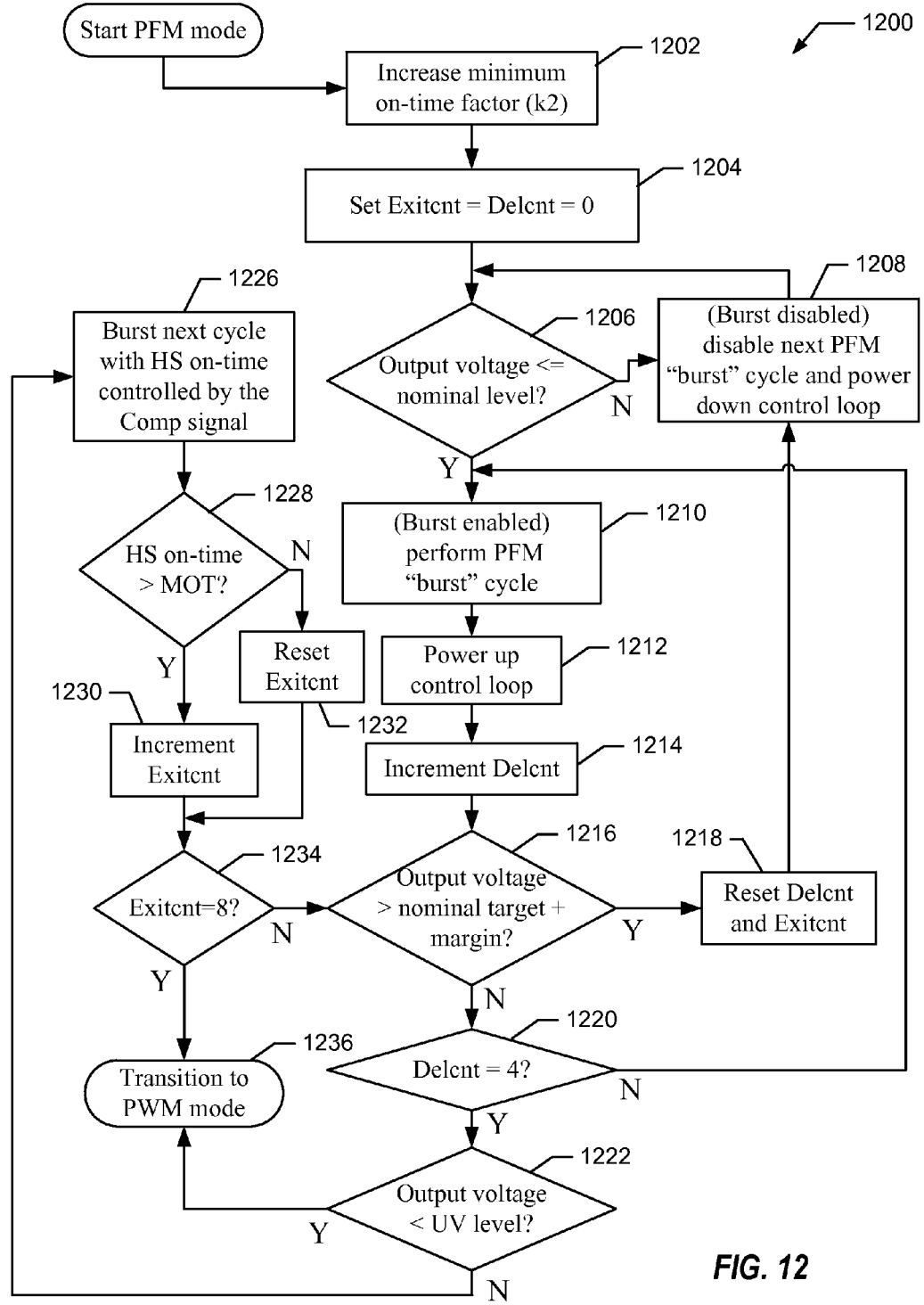
FIG. 12 shows an exemplary embodiment of a method for transitioning from the low power operating mode to the normal operating mode for use with exemplary embodiments of the switching regulator shown in FIG. 11.

FIG. 12 shows an exemplary embodiment of a method 1200 for transitioning from the low power operating mode to the normal operating mode for use with exemplary embodiments of the switching regulator 1100 shown in FIG. 11. For example, in an exemplary embodiment, the controller 204 performs the operations of the method 1200 to detect a threshold that determines when a transition from the low power operating mode to the normal operating mode is to occur. In an exemplary embodiment, the controller 204 also outputs the PWR signal to disable selected elements of the feedback circuit 212 to achieve low power consumption.

At block 1202, a minimum on-time constant value is increased from k1 to k2. For example, the mode controller 806 outputs the LPM signal to the MOT generator 202 to control the switch S1 to close thereby enabling the capacitor C2 into the circuit. The combination of capacitor C1 and C2 result in the constant value being increased to k2.

At block 1204, parameter initialization occurs. For example, an exit counter (Exitcnt) is set to zero and a delete counter (Delcnt) is set to zero. For example, the mode controller 806 comprises registers to store the Exitcnt and Delcnt and initializes their values to zero.

At block 1206, a determination is made as to whether the output voltage from the regulator is less than or equal to the nominal voltage level. For example, when the output voltage (Vout) is at or below the nominal value (regulated value, e.g., 5 volts), the method proceeds to block 1210. If the output voltage is not less than or equal to the nominal voltage level, the method proceeds to block 1008. In an exemplary embodiment, the Comp signal or the Comp OL signal indicates this state to the mode controller 806.

At block 1208, the next burst mode cycle is disabled. For example, in response to the Comp signal, the cycle skipper 808 outputs the skip control signal 812 to the signal generator 810 which disables outputting of the HS and LS signals thereby disabling the next burst mode cycle. The control loop is also powered down. For example, the mode controller 806 outputs the PWR signal to the feedback circuit to power down selected elements of the feedback circuit such that power savings are realized. The amplifier 702 is active but operates as a comparator to output the Comp OL signal so that the operation of the regulator can be monitored. The method then proceeds to block 1206.

At block 1210, the next burst mode cycle is enabled. For example, the cycle skipper 808 outputs the skip control signal 812 to the signal generator 810 which enables outputting of the HS and LS signals thereby enabling the next burst mode cycle to occur with the HS being enabled for the minimum on-time of (d*T*k2).

At block 1212, a control loop is powered up. For example, the mode controller 806 outputs the power control signal (PWR) to power up the control loop by enabling the functional elements of the feedback circuit 212. The amplifier 702 now operates in amplification mode to output the Comp signal as part of the control loop.

At block 1214, the Delcnt value is incremented. For example, the mode controller 806 comprises a register to store the Delcnt value and the mode controller 806 increments this value.

At block 1216, a determination is made as to whether the output voltage is greater than the nominal voltage plus a margin. For example, the Comp and the Comp OL signal indicate this state to the controller 204, which makes the determination. If the output voltage is greater than the nominal voltage plus the margin, the method proceeds to block 1218. If the output voltage is not greater than the nominal voltage plus the margin, the method proceeds to block 1220.

At block 1218, the Delcnt and Exitcnt values are reset. For example, the mode controller 806 resets the values for Delcnt and Exitcnt that it has stored in registers. The method then proceeds to block 1208.

At block 1220, a determination is made as to whether the Delcnt value is equal to four (4). For example, the mode controller 806 determines whether the Delcnt value it has stored in a register is equal to four. If the Delcnt value is equal to four, the method proceeds to block 1222. If the Delcnt value is not equal to four, the method proceeds to block 1210.

At block 1222, a determination is made as to whether the output voltage is less than the undervoltage level. For example, the comparator 708 indicates this state and the controller 204 makes this determination. If the output voltage is less than the undervoltage level, the method proceeds to block 1236 where a transition to the normal PWM operating mode occurs. If the output voltage is not less than the undervoltage level, the method proceeds to block 1226.

At block 1226, the next charging cycle is performed with HS on-time controller by the duration of the Comp signal. For example, the pulse timer 804 receives the Comp signal and uses this Comp signal to set the timing signal 814 that is input to the signal generator 810. For example, the Comp signal can be longer or equal to the MOT. The signal generator 810 then outputs the next charging cycle with the HS signal on-time as controlled by the Comp signal.

At block 1228, a determination is made as to whether the HS on-time is greater than the minimum on-time. For example, the pulse timer 804 determines whether or not the HS on-time is greater than the MOT. If the HS on-time is not greater than the MOT, the method proceeds to block 1232. If the HS on-time is greater than the MOT, the method proceeds to block 1230.

At block 1230, the Exitcnt value is incremented. For example, the mode controller 806 comprises a register to store the Exitcnt value and the mode controller 806 increments this value.

At block 1232, the Exitcnt value is reset. For example, the mode controller 806 comprises a register to store the Exitcnt value and the mode controller 806 resets this value.

At block 1234, a determination is made as to whether the Exitcnt value is equal to eight (8). For example, the mode controller 806 determines whether the Exitcnt value it has stored in a register is equal to eight. If the Exitcnt value is equal to eight, the method proceeds to block 1236. If the Exitcnt value is not equal to eight, the method proceeds to block 1216.

At block 1236, a transition to the PWM mode occurs. For example, the mode controller 806 transitions to the normal mode and sets the value of the LPM signal to the appropriate value.

Accordingly, the regulator 1100 performs the operations of the method 1200 described above to determine a transition from a low power mode to a normal power mode. During the method 1100, when the output voltage exceeds a nominal level, the PFM charging burst are disabled and the control loop is placed in a low power mode wherein the amplifier 702 acts as a comparator to output the Comp OL signal to the controller 204. When the output voltage is below the nominal voltage, PFM charging cycles are used to maintain the output voltage and the amplifier 702 operates in amplification mode to generate the Comp signal. The control loop is fully powered and the Comp signal is used to set the HS timing. If the output voltage falls below an under voltage threshold, the method transitions to the normal PWM charging mode. It should be noted that the operations of the method 1200 are exemplary and that minor changes, modifications, rearrangements and other changes to the operations are within the scope of the exemplary embodiments.

Figure 13:
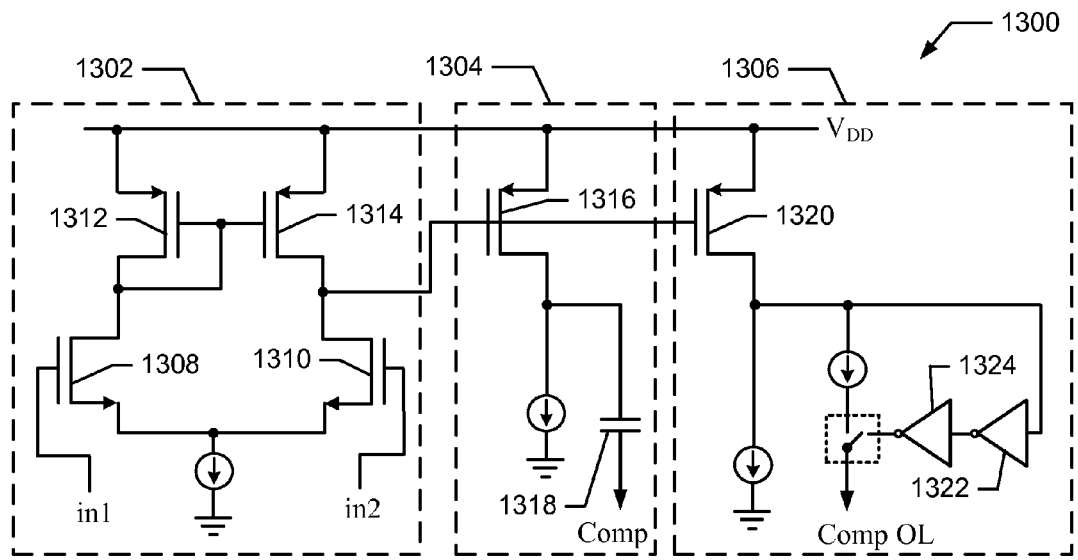
FIG. 13 shows an exemplary embodiment of an error amplifier.

FIG. 13 shows an exemplary embodiment of an error amplifier 1300. For example, the error amplifier 1300 is suitable for use as the error amplifier 702 shown in FIG. 7 and FIG. 11. The error amplifier 1300 comprises an input stage 1302 that receives inputs at terminals (in1, in 2). For example, in an exemplary embodiment the inputs in1 and in2 receive the input signals V1ref and the divided Vout signal that appears at node 720 as shown in FIG. 11. The input stage 1302 comprises transistors 1308, 1310, 1312, and 1314 that amplify the difference between the input signals to generate a difference output that flows to a first 1304 and a second 1306 output stages.

The first output stage 1304 includes transistor 1316 and capacitor 1318. The first output stage 1304 amplifies the difference signal and outputs the amplified difference signal through capacitor 1318 to other circuitry of the regulator.

The second output stage 1306 is an open loop output stage that amplifies the difference signal and provides the amplified difference signal as the Comp OL output. Inverters 1322, 1324 are used to provide a small amount of hysteresis to the Comp OL output signal. During low power consumption operation, the regulator uses the Comp OL output to form the power control loop to maintain regulation of the output voltage Vout. This provides power savings as other functional elements of the regulator may be disabled during this time interval. The first output stage 1304 continues to operate such that the Comp signal maintains an accurate value through capacitor 1318 even during the low power consumption mode. When the normal power mode is enabled, the Comp signal can be immediately used as part of the regulator control loop.

Figure 14:
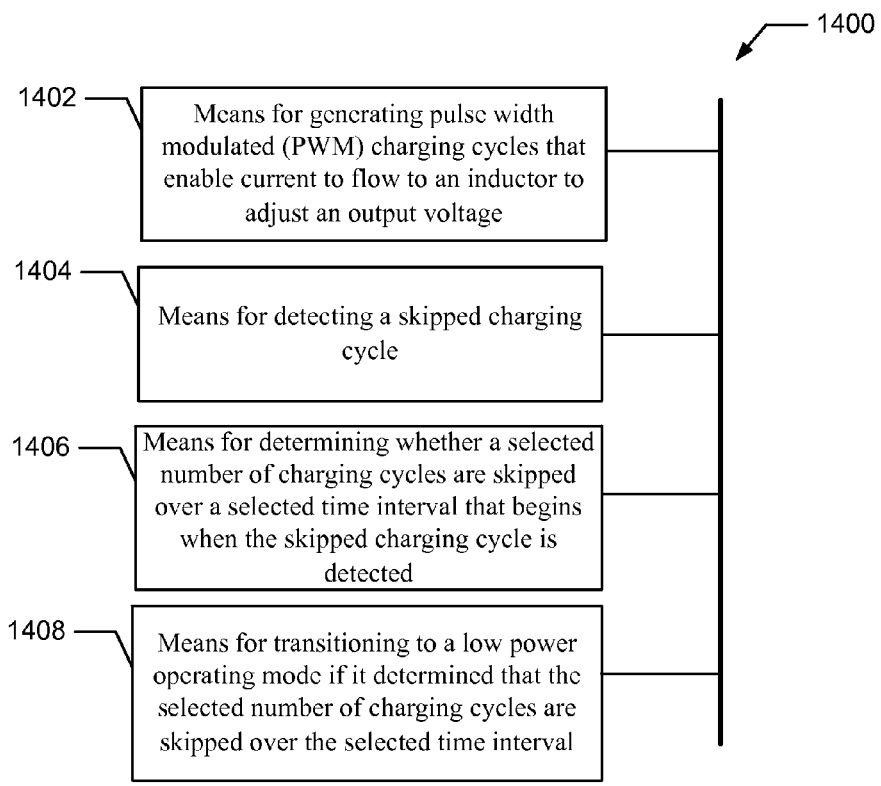
FIG. 14 shows an exemplary embodiment of a switching regulator apparatus that performs low power detection for transitioning between normal and low power operating modes.

FIG. 14 shows an exemplary embodiment of a switching regulator apparatus 1400. In an exemplary embodiment, the apparatus 1400 is suitable for use as the switching regulator 102 shown in FIG. 2.

The apparatus 1400 includes a first means 1402 for generating pulse width modulated (PWM) charging cycles that enable current to flow to an inductor to adjust an output voltage, which in an exemplary embodiment comprises the controller 204.

The apparatus 1400 also comprises a second means 1404 for detecting a skipped charging cycle, which in an exemplary embodiment comprises the controller 204.

The apparatus 1400 also comprises a third means 1406 for determining whether a selected number of charging cycles are skipped over a selected time interval that begins when the skipped charging cycle is detected, which in an exemplary embodiment comprises the controller 204.

The apparatus 1400 also comprises a fourth means 1408 for transitioning to a low power operating mode if it determined that the selected number of charging cycles are skipped over the selected time interval, which in an exemplary embodiment comprises the controller 204.

The exemplary embodiments described herein may be implemented on an IC, an analog IC, an RFIC, a mixed-signal IC, an ASIC, a printed circuit board (PCB), an electronic device, etc. The exemplary embodiments may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing an exemplary embodiment described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Although certain specific embodiments are described above for instructional purposes, the teachings of this patent document have general applicability and are not limited to the specific embodiments described above. For additional information on the structure and operation of the switching regulators, see: U.S. Provisional Application Ser. No. 62/135,799, entitled "Current Metering For Transitioning Between Operating Modes In Switching Regulators," filed Mar. 20, 2015, by Trichy et al. (the entire subject matter of which is incorporated herein by reference).

Thus, the disclosure is not intended to be limited to the examples and designs described herein but the disclose is to be accorded the widest scope consistent with the principles and novel features disclosed herein.

What is claimed is:

1. A method comprising:
   generating pulse width modulated (PWM) charging cycles that enable current to flow to an inductor to adjust an output voltage;
   detecting a skipped charging cycle;
   determining whether a selected number of charging cycles are skipped over a selected time interval that begins when the skipped charging cycle is detected; and
   transitioning to a low power operating mode if it is determined that the selected number of charging cycles are skipped over the selected time interval, wherein transitioning to the low power operating mode comprises:
   enabling a burst of pulse frequency modulated (PFM) charging cycles that enable current to flow to the inductor to increase the output voltage if it is determined that the output voltage is less than or equal to a nominal level; and
   disabling the burst of the pulse frequency modulated (PFM) charging cycles if it is determined that the output voltage is greater than the nominal voltage plus a voltage margin;
   generating a minimum on-time based on a ratio of an input voltage to the output voltage utilizing a first factor; and
   setting a pulse width of a high side (HS) charging signal to be equal to the minimum on-time during the PFM charging cycles.

2. The method of claim 1, wherein the operation of generating further comprises synchronizing the PWM charging cycles with a clock frequency.

3. The method of claim 1, wherein the operation of generating further comprises adjusting a pulse width of the HS charging signal to maintain the output voltage within a selected range.

4. The method of claim 3, further comprising:
   generating a minimum on-time based on a ratio of the input voltage to the output voltage utilizing a second factor; and
   adjusting the pulse width of the HS charging signal to be no less than the minimum on-time.

5. The method of claim 1, wherein the operation of determining comprises setting the selected number of charging cycles to 16.

6. The method of claim 1, wherein the operation of determining comprises setting the selected time interval to be between 15 and 120 charging cycles.

7. The method of claim 1, wherein said transitioning comprises skipping pulse frequency modulated (PFM) charging cycles if it is determined that the output voltage is not less than or equal to the nominal level.

8. The method of claim 1, further comprising transitioning out of the low power mode of operation and return to generating PWM charging cycles if it is determined that the output voltage is less than or equal to an undervoltage level.

9. An apparatus comprising:
a pulse timer that generates pulse width modulated (PWM) charging cycles that enable current to flow to an inductor to adjust an output voltage, wherein the pulse timer adjusts a pulse width of a high side (HS) charging signal to maintain the output voltage within a selected range, wherein the pulse timer enables a burst of pulse frequency modulated (PFM) charging cycles that enable current to flow to the inductor to increase the output voltage if it is determined that the output voltage is less than or equal to a nominal level, and disables the burst of the pulse frequency modulated (PFM) charging cycles if it is determined that the output voltage is greater than the nominal voltage plus a voltage margin;
a mode controller that detects a skipped charging cycle and determines whether a selected number of charging cycles are skipped over a selected time interval that begins when the skipped charging cycle is detected, and wherein the mode controller transitions the apparatus to a low power operating mode if it determined that the selected number of charging cycles are skipped over the selected time interval; and
a minimum on-time generator that generates a minimum on-time based on a ratio of an input voltage to the output voltage utilizing a first factor, and wherein the pulse timer sets a pulse width of the HS charging signal to be equal to the minimum on-time during the PFM charging cycles.

10. The apparatus of claim 9, wherein the minimum on-time generator that generates a minimum on-time based on a ratio of the input voltage to the output voltage utilizes a second factor, and wherein the pulse timer adjusts the pulse width of the HS charging signal to be no less than the minimum on-time.

11. The apparatus of claim 9, wherein the mode controller sets the selected number of charging cycles to 16.

12. The apparatus of claim 9, wherein the mode controller sets the selected time interval to be between 15 and 120 charging cycles.

13. The apparatus of claim 9, further comprising a cycle skipper that skips pulse frequency modulated (PFM) charging cycles if it is determined that the output voltage is not less than or equal to the nominal level.

14. The apparatus of claim 9, wherein the mode controller transitions the apparatus out of the low power mode of operation and returns the apparatus to generating PWM charging cycles if it is determined that the output voltage is less than or equal to an undervoltage level.

15. An apparatus comprising:
means for generating pulse width modulated (PWM) charging cycles that enable current to flow to an inductor to adjust an output voltage, wherein the means adjusts a pulse width of a high side (HS) charging signal to maintain the output voltage within a selected range, and wherein the means enables a burst of pulse frequency modulated (PFM) charging cycles that enable current to flow to the inductor to increase the output voltage if it is determined that the output voltage is less than or equal to a nominal level, and disables the burst of the pulse frequency modulated (PFM) charging cycles if it is determined that the output voltage is greater than the nominal voltage plus a voltage margin;
means for detecting a skipped charging cycle, wherein the means determines whether a selected number of charging cycles are skipped over a selected time interval that begins when the skipped charging cycle is detected, and wherein the means causes a low power operating mode to be enabled if it is determined that the selected number of charging cycles are skipped over the selected time interval; and
means for generating a minimum on-time based on a ratio of an input voltage to the output voltage utilizing a factor, wherein the means sets a pulse width of the HS charging signal to be equal to the minimum on-time during the PFM charging cycles.

16. The apparatus of claim 15, wherein the means for generating charging cycles is a pulse timer, wherein the means for detecting a skipped charging cycle is a mode controller, and wherein the means for generating a minimum on-time is a minimum on-time generator.

* * * * *